(12) United States Patent
Wilson et al.

(10) Patent No.: US 10,591,963 B2
(45) Date of Patent: Mar. 17, 2020

(54) HOUSING FOR A COMPUTER SYSTEM, PARTS OF A HOUSING FOR A COMPUTER SYSTEM, AND METHODS FOR INCREASING AN AIRFLOW IN A HOUSING OF A COMPUTER SYSTEM

(71) Applicants: RAZER (ASIA-PACIFIC) PTE. LTD., Singapore (SG); John Alexander Wilson, San Francisco, CA (US); Robert Haden Garrett, San Francisco, CA (US)

(72) Inventors: John Alexander Wilson, San Francisco, CA (US); Robert Haden Garrett, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 41 days.

(21) Appl. No.: 15/312,167

(22) PCT Filed: May 20, 2014

(86) PCT No.: PCT/US2014/038680
§ 371 (c)(1),
(2) Date: Nov. 17, 2016

(87) PCT Pub. No.: WO2015/178890
PCT Pub. Date: Nov. 26, 2015

(65) Prior Publication Data
US 2017/0168529 A1    Jun. 15, 2017

(51) Int. Cl.
*G06F 1/20* (2006.01)
*G06F 1/16* (2006.01)

(52) U.S. Cl.
CPC .............. *G06F 1/203* (2013.01); *G06F 1/166* (2013.01); *G06F 1/1615* (2013.01)

(58) Field of Classification Search
CPC ................................. G06F 1/203; G06F 1/615
See application file for complete search history.

(56) References Cited

U.S. PATENT DOCUMENTS 6,049,455 A * 4/2000 Nakamura ............ G06F 1/203
                                               165/80.3
6,094,347 A   7/2000 Bhatia
(Continued)

FOREIGN PATENT DOCUMENTS

CN        2492878 Y      5/2002
CN     101520674 A       9/2009
(Continued)

OTHER PUBLICATIONS

Extended European Search Report dated Nov. 16, 2017 in corresponding EP Patent Application No. 14892621.5, 8 pages.
(Continued)

*Primary Examiner* — James Wu
*Assistant Examiner* — Michael A Matey
(74) *Attorney, Agent, or Firm* — Polsinelli PC

(57) ABSTRACT

According to various embodiments, a housing for a computer system may be provided. The housing may include: an upper portion configured to hold an input device of the computer system; a lower portion comprising a foot of the housing for the computer system; and a pressure drop reducing mechanism configured to increase an airflow between the upper portion and the lower portion by moving the lower portion away from the upper portion.

20 Claims, 14 Drawing Sheets

(56) References Cited

U.S. PATENT DOCUMENTS

| | | | |
|---|---|---|---|
| 6,407,921 B1* | 6/2002 | Nakamura | G06F 1/203 |
| | | | 165/104.33 |
| 6,459,573 B1* | 10/2002 | DiStefano | G06F 1/203 |
| | | | 361/679.46 |
| 6,515,856 B2* | 2/2003 | Hidesawa | G06F 1/203 |
| | | | 361/679.48 |
| 8,976,524 B2* | 3/2015 | Wang | H05K 5/0213 |
| | | | 165/104.33 |
| 2002/0018337 A1 | 2/2002 | Nakamura | |
| 2004/0212958 A1 | 10/2004 | Jones et al. | |
| 2006/0094347 A1 | 5/2006 | Tracy et al. | |
| 2007/0041157 A1 | 2/2007 | Wang | |
| 2012/0127652 A1* | 5/2012 | Lin | G06F 1/203 |
| | | | 361/679.46 |
| 2013/0021722 A1* | 1/2013 | Guo | G06F 1/1616 |
| | | | 361/679.01 |
| 2017/0153677 A1* | 6/2017 | Cheng | G06F 1/203 |

FOREIGN PATENT DOCUMENTS

| | | |
|---|---|---|
| CN | 201600613 U | 10/2010 |
| CN | 202093421 U | 12/2011 |
| TW | 201409215 A | 3/2014 |
| WO | 2014/035362 A1 | 3/2014 |

OTHER PUBLICATIONS

Office Action (including English Translation) dated Sep. 14, 2018, for the corresponding Taiwanese Application No. 104108078 in 16 pages.

Office Action (including English Translation) dated Nov. 20, 2018, for the corresponding Chinese Application No. 201480078998.5 in 19 total pages.

Office Action (including English Translation) dated May 29, 2019, for the corresponding Chinese Application No. 201480078998.5 in 15 total pages.

* cited by examiner

VIRTUAL PIVOT LOCATION AT THE FRONT FOOT

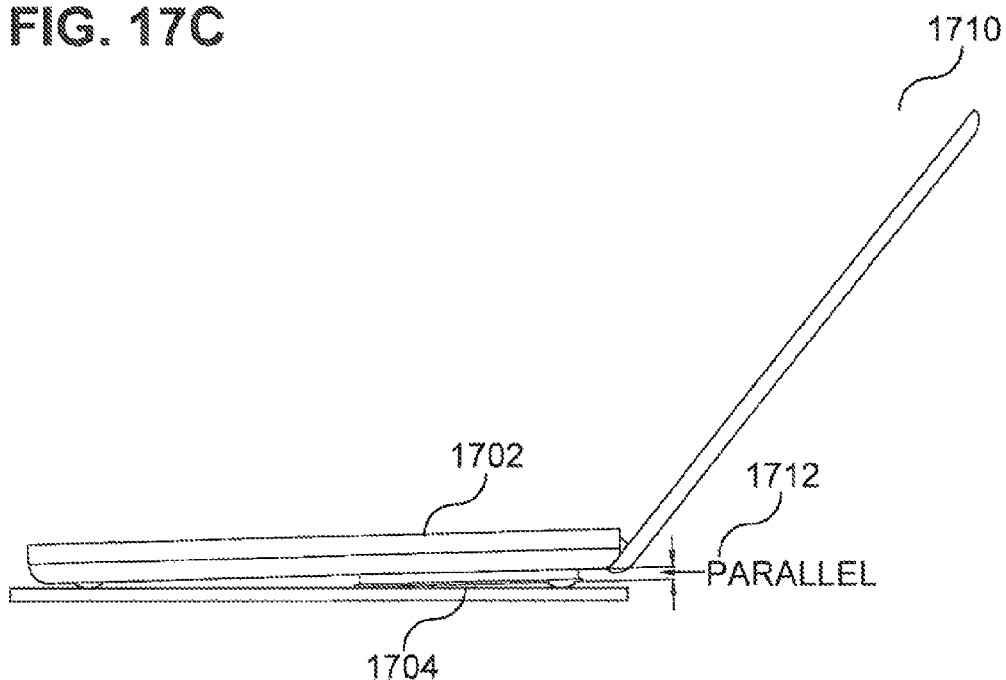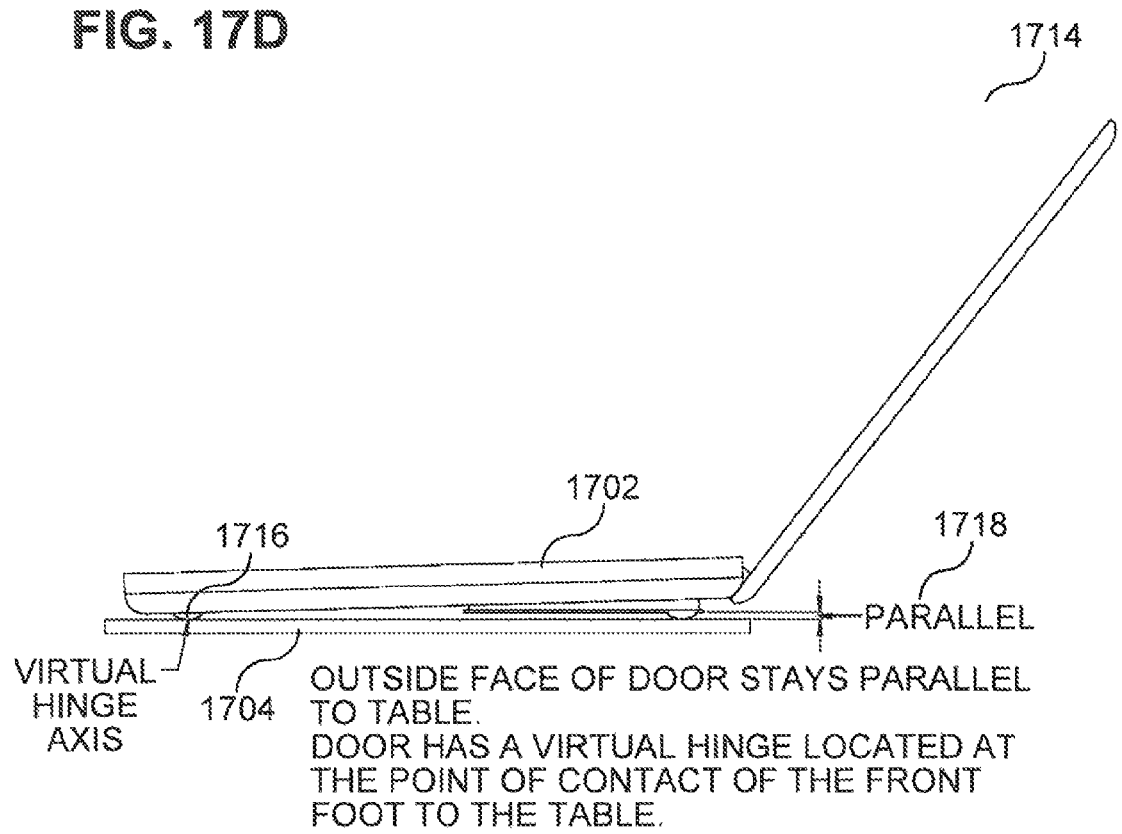

HOUSING FOR A COMPUTER SYSTEM, PARTS OF A HOUSING FOR A COMPUTER SYSTEM, AND METHODS FOR INCREASING AN AIRFLOW IN A HOUSING OF A COMPUTER SYSTEM

TECHNICAL FIELD

Various embodiments generally relate to housings for a computer system, parts of a housing for a computer system, and methods for increasing an airflow in a housing of a computer system.

BACKGROUND

Mobile computer systems such as laptop computers or notebook computers may be designed to be as portable as possible. Thus, there may be the need for thin mobile computer systems.

SUMMARY OF THE INVENTION

According to various embodiments, a housing for a computer system may be provided. The housing may include: an upper portion configured to hold an input device of the computer system; a lower portion including a foot of the housing for the computer system; and a pressure drop reducing mechanism configured to increase air airflow between the upper portion and the lower portion by moving the lower portion away from the upper portion.

According to various embodiments, a part of a housing for a computer system may be provided. The part may include a pressure drop reducing mechanism configured to increase an airflow between an upper portion of the housing and a lower portion of the housing by moving the lower portion away from the upper portion.

According to various embodiments, a method for increasing an airflow in a housing of a computer system may be provided. The method may include moving a lower portion of the housing away from an upper portion of the housing.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 17A to FIG. 17D show various ways of opening a thermal door.

DETAILED DESCRIPTION

Figure 1:
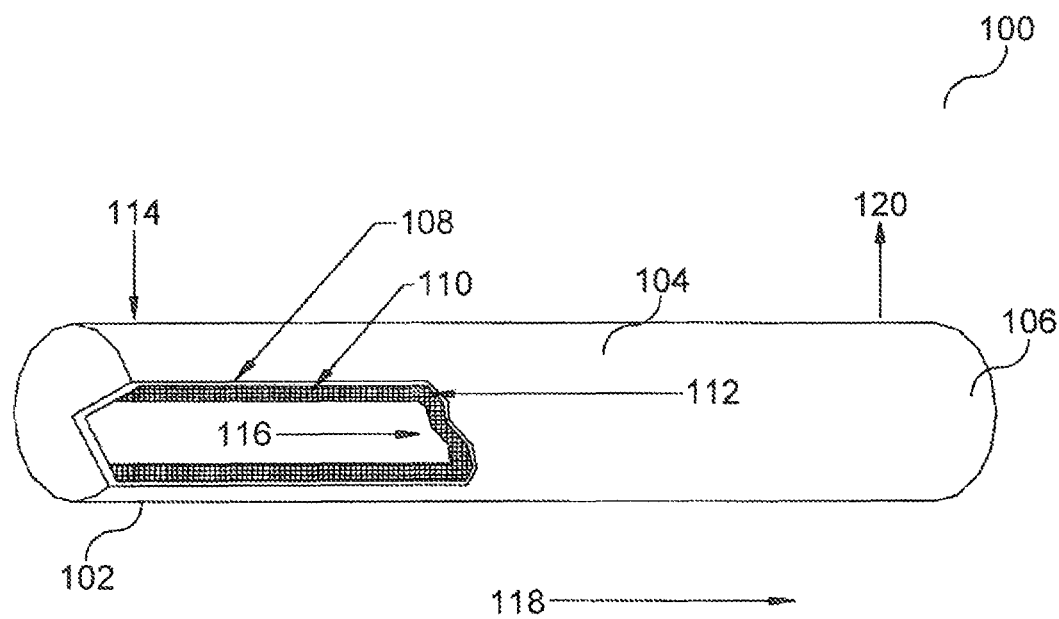
FIG. 1 shows a three-dimensional, partially cut-open, view of a heat pipe.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold or the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

According to various embodiments, devices and methods may be provided to improve notebook computer cooling system efficiency without increasing the apparent unit thickness.

Form factors of systems devices such as notebook computers and handhelds continue to shrink. The X & Y (width and depth) of a notebook computer may usually be driven by the display size, so the dimension over which system designers may have the most impact may be in Z (thickness).

Constant innovation may be required to be able to dispel large amounts of thermal energy in ever thinner enclosures.

Most high power notebooks may use a heat pipe (HP; or heat pipe) to transfer (or transport) heat efficiently away from the hottest chip. Heat may be removed from the HP by a heat exchanger that may transfer the heat to air that is forced through the heat exchanger (HTx) by a blower. According to various embodiments, one way to increase system efficiency is to reduce the pressure drop through the system. Lower pressure drop equals higher flow rate with any given blower.

According to various embodiments, the efficiency of a notebook computer cooling system may be increased by improving airflow through the blower while allowing the system to have a low Z-height when not in use. According to various embodiments, one panel of the computer may be opened, effectively creating more Z-height, to allow for greater airflow into the blower and out of the heat exchanger when the unit is operating. When the unit is non-operating, the door may be closed and the unit may have a reduced Z-height.

FIG. 1 shows a three-dimensional, partially cut-open, view of a heat pipe 100. The heat pipe 100 may be a thermal linkage of very high thermal conductivity. It may be a closed, evacuated chamber with a shell 108 and lined with a wick 110. Heat may be transported (or transferred) by evaporation of a volatile fluid, which may be condensed at a cold end (or condenser end) 106 of the pipe and returned by capillary action to a hot end (or evaporator end) 102 like indicated by an arrow 112. The vapor may pass through the cavity like indicated by an arrow 116. Heat pipes may include three zones: the evaporator 102, the condenser 106 and an adiabatic section 104 connecting the two. This device may have many times the heat transfer capacity of the best heat-conducting materials. Heat may be put in at 114 to the heat pipe, and put out at 120, so, that the heat may flow like indicated by an arrow 118.

Figure 2:
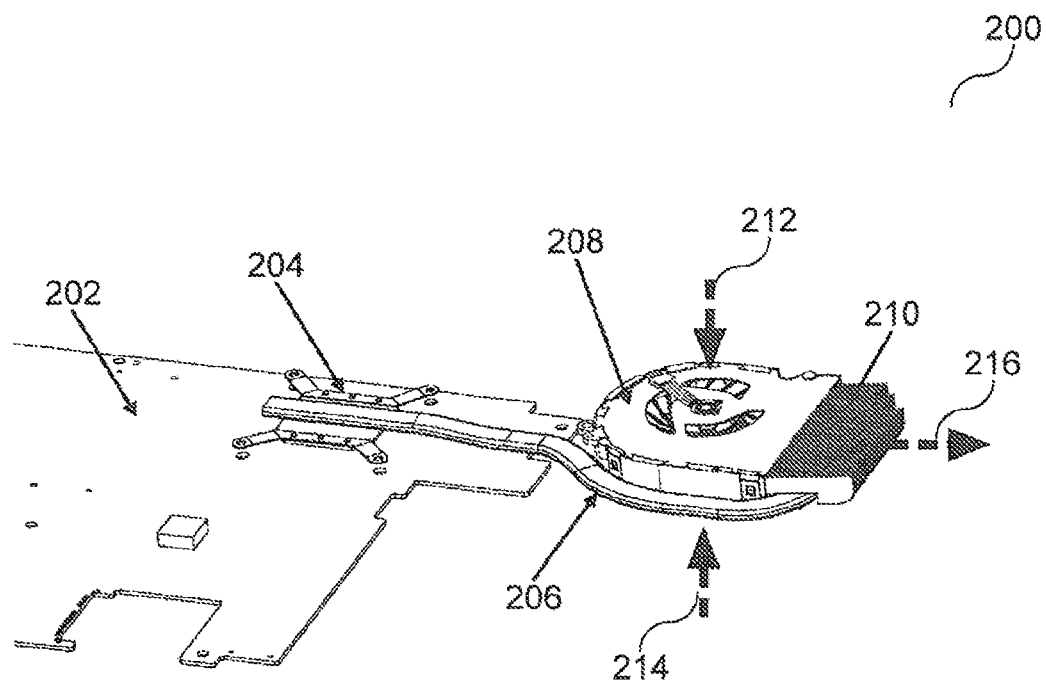
FIG. 2 shows a computer cooling system.

FIG. 2 shows a computer cooling system 200, for example a notebook computer cooling system. In notebook computer cooling applications, the evaporator end of a HP 206 may be attached to a heat producing component (for example a CPU (central processing unit) and/or GPU (graphics processing unit) provided on a PCB (printed circuit board) 202) through a heat transfer plate 204, which may be in intimate contact with the component and the HP. Heat may be transferred through the heat pipe and dissipated on the condensing end through a heat exchanger (HTx) 210. An HTx may include or may consist of a plurality of fins attached to the condensing end of the HP 206. A blower 208 or fan may be used to force air through the heat exchanger 210. Heat from the system may be transferred to the air input by cool air inlets 212 and 214, and blown out of the system through a hot air outlet 216.

Figure 3A:
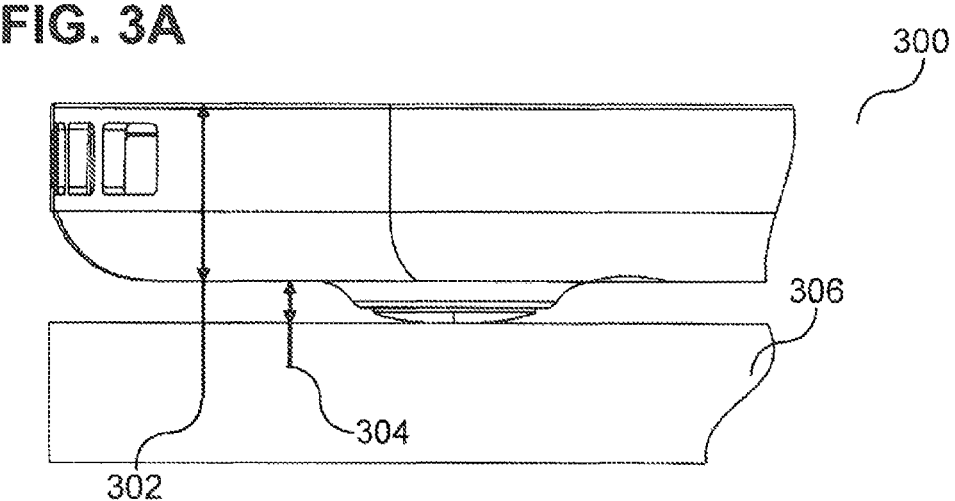
FIG. 3A shows a side view of a computer system.

FIG. 3A shows a side view 300 of a computer system (or in other words: computing system). In FIG. 3A, the apparent thickness of a notebook computer is illustrated. It may be common practice in the industry to specify the apparent thickness 302 of a notebook computer, which is the distance between major upper and lower surfaces of the computer, not including any local projections from the major surfaces, such as feet (the height of a foot 304 is shown in FIG. 3A with reference to a surface on which the computer system stands, for example a desk 306). In order to provide a gap for air to flow under the computer and into the cooling system blower, it may also be common for notebook computers to have feet that project several millimeters from the major surface. According to various embodiments, this projection may be used to improve the efficiency of the cooling system.

For a device such as a notebook computer, the size of the heat exchanger may be driven by physical constraints of the housing. Typically, there may be some height available for the heat exchanger which may be filled with heat exchanger fins. The open area through the fins may be restricted by the heat pipe which may be desired to extend along the length of the heat exchanger and make contact to each fin. Since the heat pipe may occupy some percentage of the open fin area of the heat exchanger, airflow through the heat exchanger may be reduced.

Figure 3B:
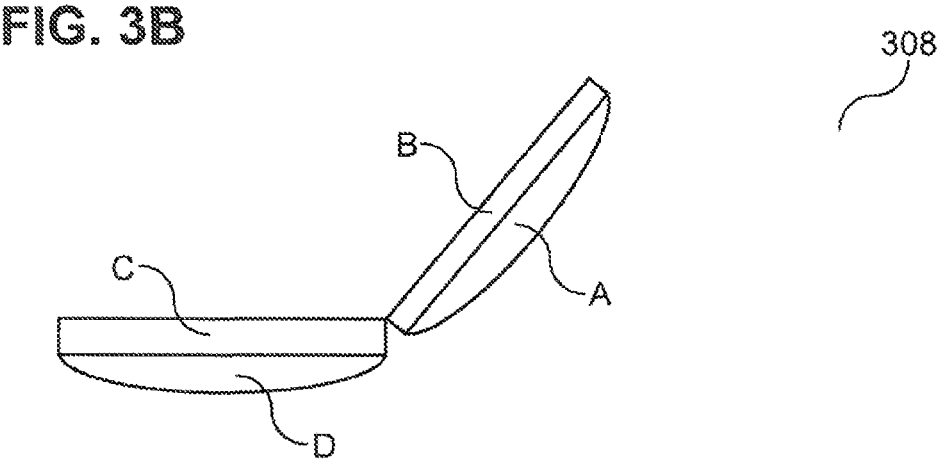
FIG. 3B shows a side view of commonly used components of a notebook computer housing.

FIG. 3B shows a side view 308 of commonly used components of a notebook computer housing. The industry may use a shorthand part designation for notebook computers because almost all have the same four major parts, which may be referred to as the A part, the B part, the C part, and the D part, like shown in FIG. 3B. These may be the major housing parts that are visible to the user, and are named in order starting from top to bottom of a closed computer. It will be understood that although these four parts may be present in each notebook computer housing, the actual shape and details of these parts may differ between various notebooks.

The A-part may include or may be the back housing of the display assembly, and may be the most structural part of the notebook computer housing.

The B-part may include or may be the front housing of the display, and may be a bezel around the display.

The C-part may include or may be the upper housing of the main unit that contains the keyboard and the track pad, and may be the most main structural unit.

The D-part may include or may be the lower housing or cover on the bottom of the computer.

Figure 4:
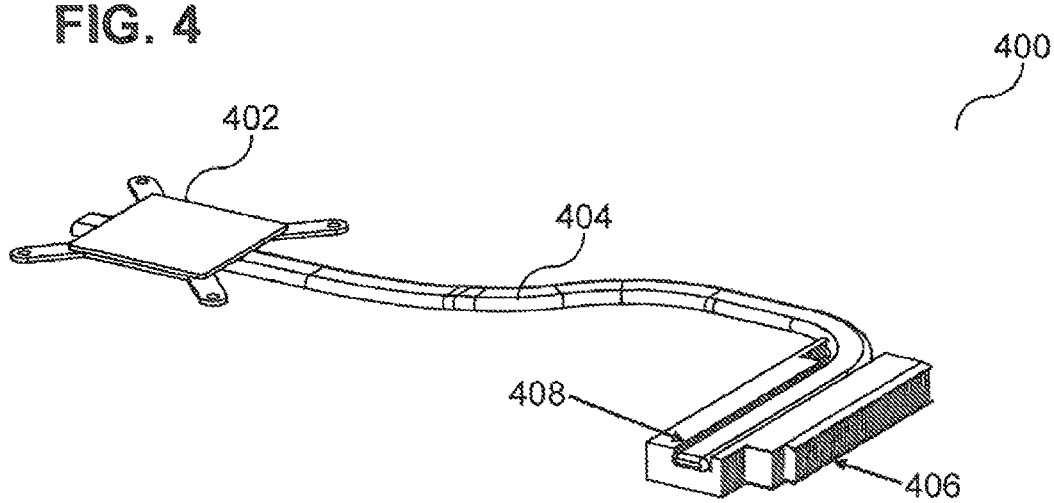
FIG. 4 shows a heat pipe assembly.

FIG. 4 shows a heat pipe assembly 400. A heat generating device 402 may be coupled to a first end of the heat pipe 404 (for example using a heat transfer plate). A second, end of the heat pipe 404 may be coupled to a heat exchanger 406. Like indicated by arrow 408, the heat pipe 404 may be buried in the heat exchanger fins. This may restrict the air flow through the fins, which may decrease efficiency.

Figure 5:
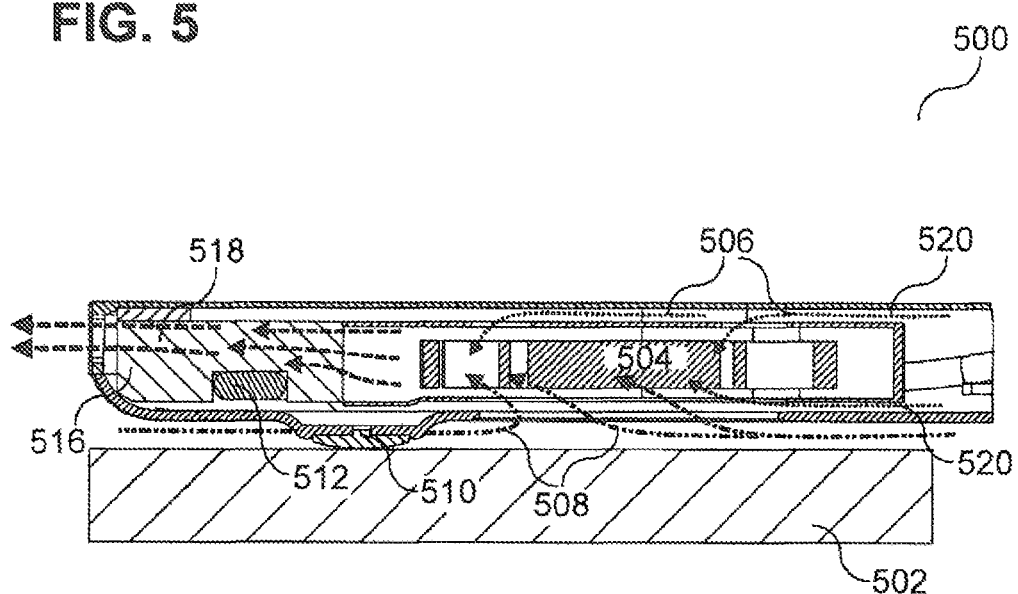
FIG. 5 shows a cross-sectional view of a cooling system.

FIG. 5 shows a cross-sectional view 500 of a cooling system known in the industry, indicating an air flow (for example a typical air flow) through a notebook computer with typical Z-height (for example large Z-height) known in the industry. The cross-section through a blower 504 (for example including fan blades) and heat exchanger fins 516 of the cooling system may show the airflow restriction caused by a heat pipe 512 being buried in the heat exchanger fin area. The computer system may stand on a surface, for example a desktop 502. Cool air may be drawn in by the blower 504 through vents in the bottom housing, like indicated by dashed-and-dotted arrows 508. In other words: Cool air from the outside of the computer may be drawn into the blower 504 through vents which penetrate the skin of the computer, like indicated by dashed-and-dotted arrows 508. Warm air may be drawn by the blower 504 from inside, like indicated by dotted arrows 506. In other words: Warm air from inside the computer may flow into the blower 504 through the gaps above and below the fan, like indicated by dotted arrows 506. This component of the air flow may be important for the cooling of components not directly cooled by the heat pipe. Air drawn through the housing may cool components that are not attached to the heat pipe. A foot 510 may provide a gap between the table (or desktop 502) and the bottom housing for air flow to flow through the bottom vents. The heat pipe 512 may be brazed or soldered to heat exchanger fins. Like indicated by dashed arrows 518, the heat exchanger may transfer heat from the fins 516 to the air. The hot air may then be expelled from the system. As described, air flow through the heat exchanger may be reduced due to the fact that the heat pipe 512 resides in the same volume as the heat exchanger. Large gaps 520 above and below the blower may allow for relatively free airflow (for example into the blower 504).

Figure 6:
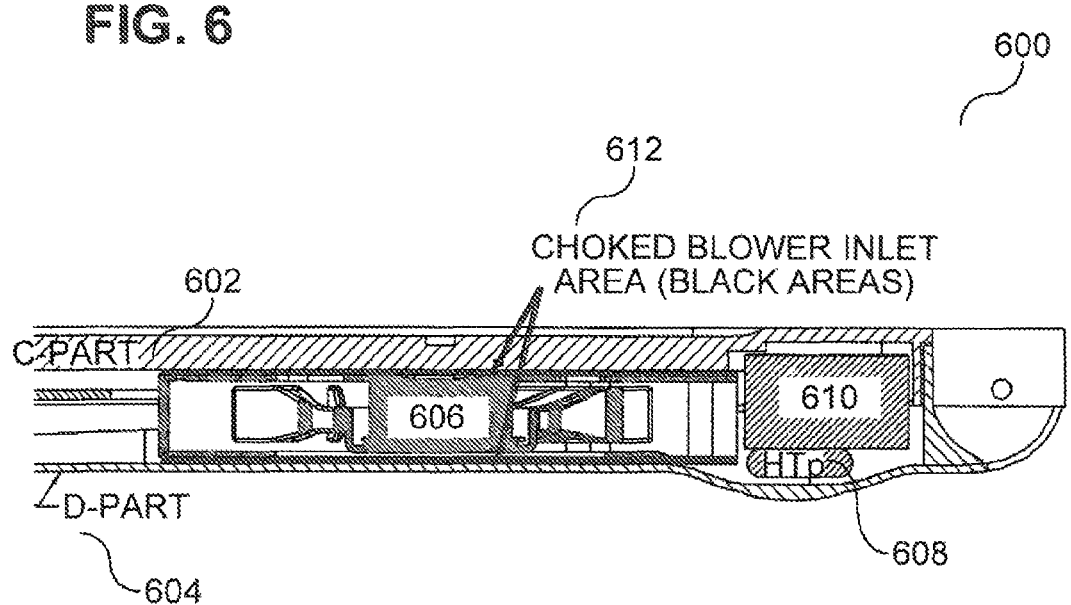
FIG. 6 shows a reduced Z-height notebook computer.

FIG. 6 shows a reduced Z-height notebook computer 600 with a C part 602 of a housing for the computer and a D part 604 of the housing, and with a blower 606, a heat pipe (HTp) 608 and a heat exchanger (HTx) 610. In the computer 600, air flow to the blower 606 may be choked, like indicated by arrows 612. In other words: In a computer 600 with minimum Z-height, a flow to blower inlets may be choked. Small gaps above and below the blower 606 may reduce the air low into the blower 606, and may cause reduced flow throughout the system.

Figure 7:
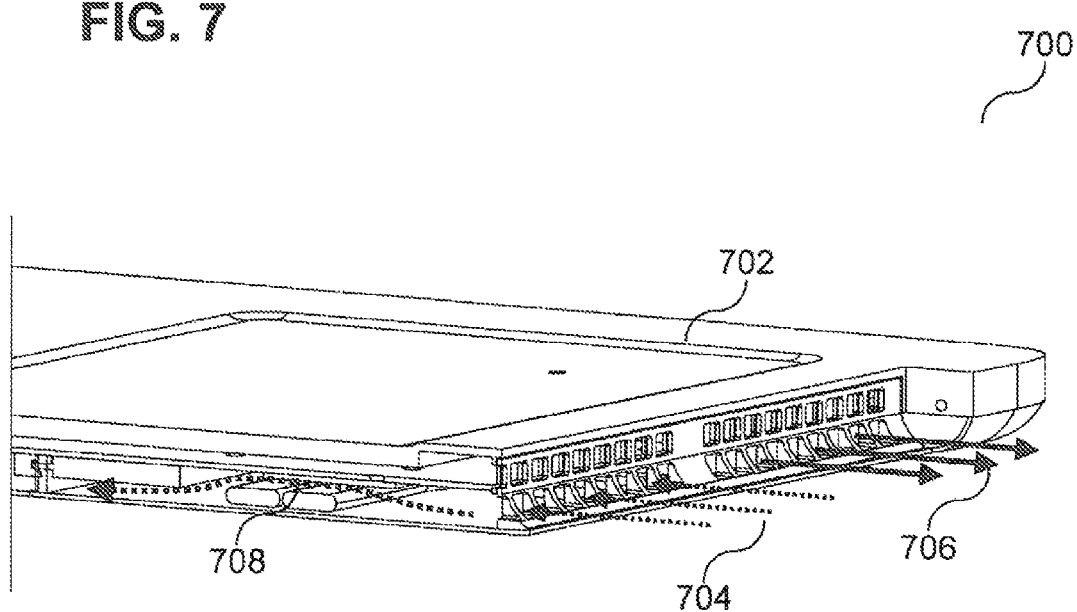
FIG. 7 shows airflow in and out of a portion of a commonly used notebook computer.

FIG. 7 shows a portion of a commonly used notebook computer 700. A part of a housing 702 for the notebook computer is shown. It is to be noted that a commonly used notebook computer and a computer with a housing according to various embodiments, in which a thermal door, like will be described in more detail below, is closed, are similar with respect to what is described for FIG. 7. Cool air may be input to the housing, through a cool air inlet, as indicated by dotted arrows 704. Hot air may be exhausted from a heat exchanger of the computer, like indicated by solid arrows 706. As indicated by dotted arrow 708, a cool air path through the system may be obstructed by tightly packet components. The tightly packed components may reduce (or restrict) the flow through (or throughout) the interior of a typical notebook computer.

In commonly used computers, in order to have a thin computer, the inlets to the blower may be choked by reduced gaps above and below the fan.

According to various embodiments, devices and methods may be provided to improve notebook computer cooling system efficiency without increasing apparent unit thickness employing an articulated panel to improve airflow. For example, a thermal door may be provided, like will be described in more detail below.

Figure 8:
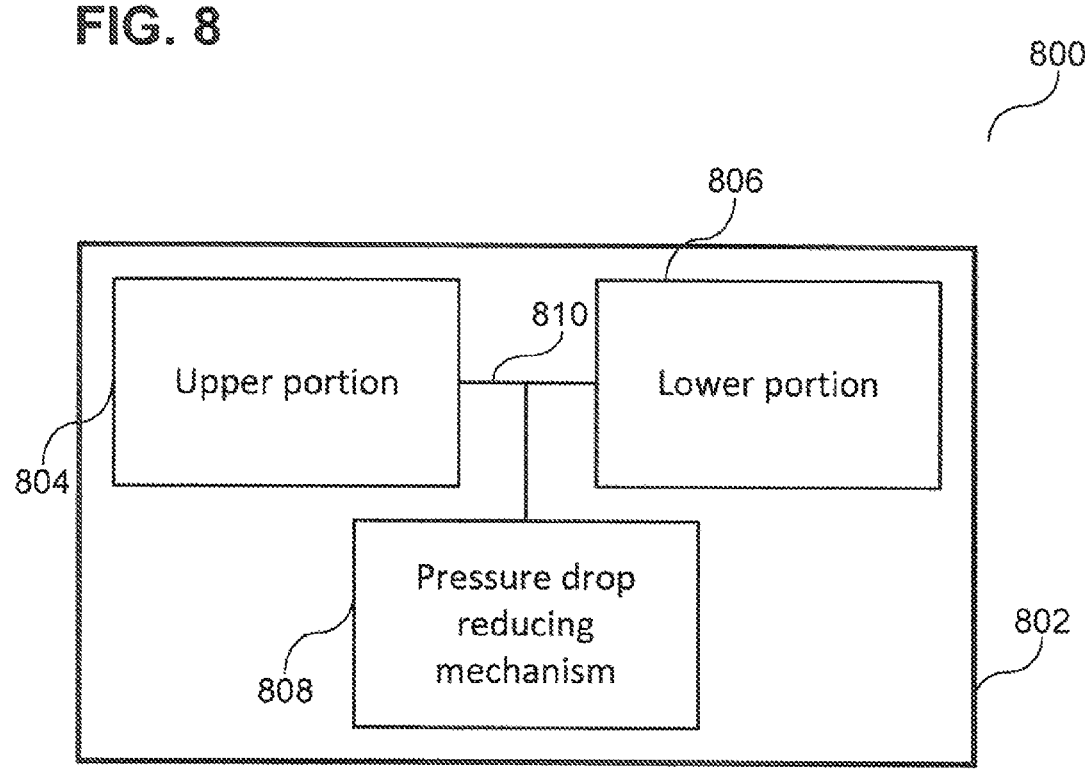
FIG. 8 shows a schematic illustration of a housing according to various embodiments for a computer system.

FIG. 8 shows a schematic illustration 800 of a housing 802 according to various embodiments for a computer system. The housing 802 may include an upper portion 804 configured to hold an input device (for example a keyboard or a touch pad) of the computer system. The housing 802 may further include a lower portion 806, which may include a loot of the housing 802 for the computer system. The housing 802 may further include a pressure drop reducing mechanism 808 (which may also be referred to as an airflow increasing mechanism or as an airflow restriction reducing mechanism) configured to increase an au low between the upper portion 804 and the lower portion 806 by moving the lower portion 806 away from the upper portion 804. The upper portion 804, the lower portion 806, and the pressure drop reducing mechanism 808 may be coupled like indicated by lines 810, for example mechanically or electrically coupled.

The upper portion 804 may include or may be a C part.

The lower portion 806 may include or may be at least a portion of a D part.

The pressure drop reducing mechanism 808 may be configured to linearly move the lower portion 806 away from the upper portion 804.

The pressure drop reducing mechanism 808 may be configured to rotate the lower portion 806 away from the upper portion 804.

The pressure drop reducing mechanism 808 may include or may be a hinge.

The pressure drop reducing mechanism 808 may include or may be a four bar mechanism.

The pressure drop reducing mechanism 808 may include a slider mechanism.

The pressure drop reducing mechanism 808 may include a motor.

The pressure drop reducing mechanism 808 may be coupled to a display housing for the computer system.

The pressure drop reducing mechanism 808 may be configured to increase the airflow when the display housing is folded away from the upper portion 804 of the housing 802.

The housing 802 may further include a blower (not shown). The pressure drop reducing mechanism 808 may be further configured to tilt the blower when moving the lower portion 806 away from the upper portion 804.

Figure 9:
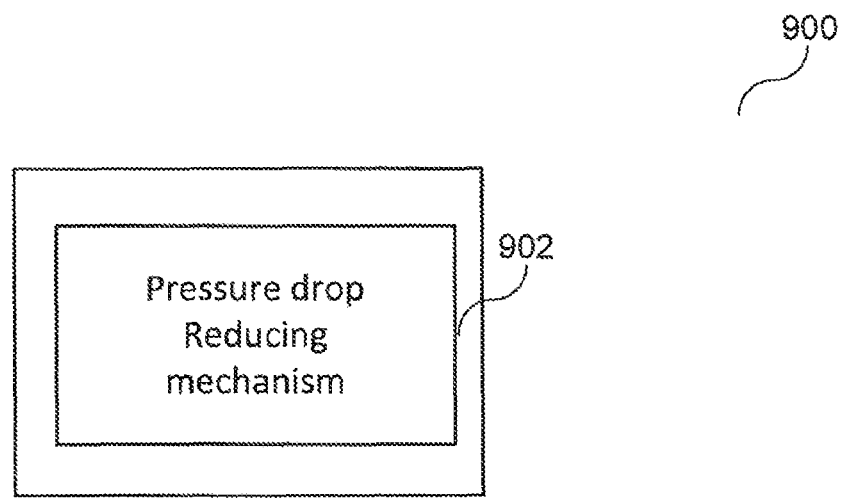
FIG. 9 shows a part according to various embodiments of a housing for a computer system.

FIG. 9 shows a part 900 according to various embodiments of a housing for a computer system. The part 900 may include a pressure drop reducing mechanism 902 configured to increase an airflow between an upper portion of the housing and a lower portion of the housing by moving the lower portion away from the upper portion. The upper portion may be configured to hold an input device of the computer system and the lower portion may include or may be a foot of the housing for the computer system.

The part 900 may include or may be the upper portion.
The part 900 may include or may be a C part.
The part 900 may include or may be the lower portion.
The part 900 may include or may be at least a portion of a D part.

The pressure drop reducing mechanism 902 may be configured to linearly move the lower portion away from the upper portion.

The pressure drop reducing mechanism 902 may be configured to rotate the lower portion away from the upper portion.

The pressure drop reducing mechanism 902 tray may include or may be a hinge.

The pressure drop reducing mechanism 902 may include or may be a four bar mechanism.

The pressure drop reducing mechanism 902 may include a slider mechanism.

The pressure drop reducing mechanism 902 may include a motor.

The pressure drop reducing mechanism 902 may be coupled to a display housing for the computer system.

The pressure drop reducing mechanism 902 may be configured to increase the airflow when the display housing is folded away from the upper portion of the housing.

The pressure drop reducing mechanism 902 may be further configured to tilt a blower inside the housing when moving the lower portion away from the upper portion.

Figure 10:
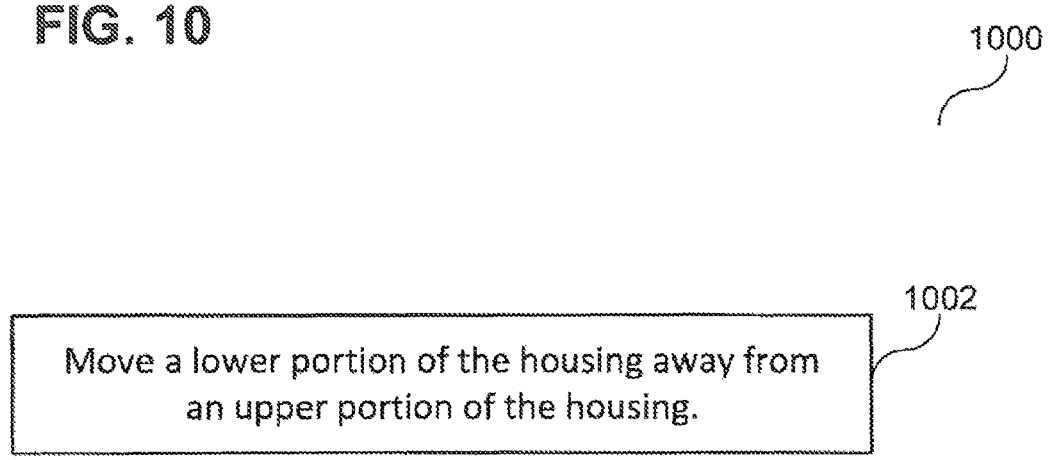
FIG. 10 shows a diagram illustrating a method according to various embodiments for increasing an airflow in a housing of a computer system.

FIG. 10 shows a diagram 1000 illustrating a method according to various embodiments for increasing an airflow in a housing of a computer system. In 1002, a lower portion of the housing may be moved away from an upper portion of the housing. The upper portion may be configured to hold an input device of the computer system and the lower portion may include or may be a foot of the housing for the computer system.

The upper portion may include or may be a C part.

The lower portion may include or may be at least a portion of a D part.

Moving a lower portion of the housing away from an upper portion of the housing may include or may be linearly moving the lower portion away from the upper portion.

Moving a lower portion of the housing away from an upper portion of the housing may include or may be rotating the lower portion away from the upper portion.

The lower portion of the housing may be moved away from an upper portion of the housing using a hinge.

The lower portion of the housing may be moved away from an upper portion of the housing using a four bar mechanism.

The lower portion of the housing may be moved away from an upper portion of the housing using a slider mechanism.

The lower portion of the housing may be moved away from an upper portion of the housing using a motor.

Moving a lower portion of the housing away from an upper portion of the housing may be performed using a pressure drop reducing mechanism which is coupled to a display housing for the computer system.

The lower portion of the housing may be moved away from the upper portion of the housing when the display housing is folded away from the upper portion of the housing.

According to various embodiments, a housing for a computer system (or a computer with a housing) may be provided with a lower portion, for example an articulated panel, which may also be referred to as thermal door, which may (for example using a pressure drop reducing mechanism) be opened during operation and allow more gap above and below the fan, and therefore, higher airflow through the blower. In addition to reducing the pressure drop across the blower, the increased volume available for airflow throughout the system may reduce the pressure drop across the entire system. This additional volume available for air flow may be ducted to provide a low resistance airflow path over critical components, which may be difficult to achieve in the highly obstructed environment typical inside a notebook computer that is tightly packed with components.

Figure 11:
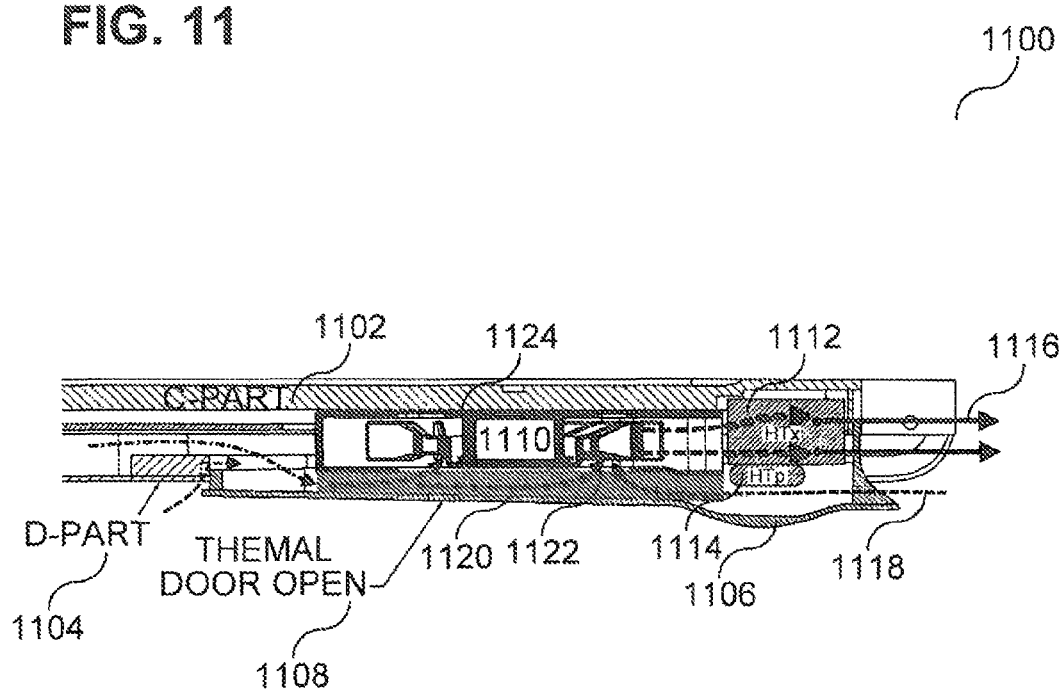
FIG. 11 shows a part of a housing for a notebook computer according to various embodiments with a thermal door open.

FIG. 11 shows a part of a housing for a notebook computer 1100 according to various embodiments with a thermal door 1106, in which the thermal door 1106 is open, like indicated by 1108. The housing may include a C-part 1102 and a D-part 1104. Inside the housing there may be provided a heat pipe (HTp) 1114. One end of the heat pipe may be connected to a heat exchanger (HTx) 1112. The heat pipe 1114 may transport heat from a heat generating device (not shown) to the heat exchanger 1112. The notebook computer may have a small (for example minimal) overall Z-height when non-operating. In operation, the thermal door may be opened and may create an unobstructed flow path into a blower 1110 and throughout the system. Warm air may be drawn across other system components due to the greater air gap created by the open door, like indicated by dash-dotted arrows, for example 1120. Cool air may be drawn in from the outside through vents adjacent to exhaust vents, like indicated by dashed arrow 1118. As is shown in FIG. 11, an increased air flow gap 1122 (which is shown as a hatched area illustrating the increased fan inlet area below the fan) may be provided under the blower 1110. As illustrated in FIG. 11, an improved air flow through a computer with an open thermal door may be provided. Above the blower 1110, the gap to a C-part 1102 of the housing may be too small for inlet flow above the fan, which may be illustrated by the black area 1124 in FIG. 11.

The heat generating device may include or may be or may be included in a central processing unit and/or a graphics processing unit.

The heat exchanger 1112 may include or may be a plurality of fins. The fins may have an at least generally rectangular shape.

The blower 1110 may be configured to blow air through the heat exchanger 1112.

Another end of the heat pipe 1114 may be configured to be connected to a heat generating device.

The heat generating device may include or may be or may be included in a central processing unit and/or a graphics processing unit.

According to various embodiments, the lower part may be at least a portion of a D-part. It will be understood that for the housing of a notebook computers, parts may be labeled according to the letters of the alphabet. For example, the backside housing of the display may be an A-part, the side of the housing exposing the screen may be a B-part, the lower part of the housing holding the keyboard may be a C-part, and the backside of the housing, for example including the feet of the notebook computer, may be a D-part.

Figure 12:
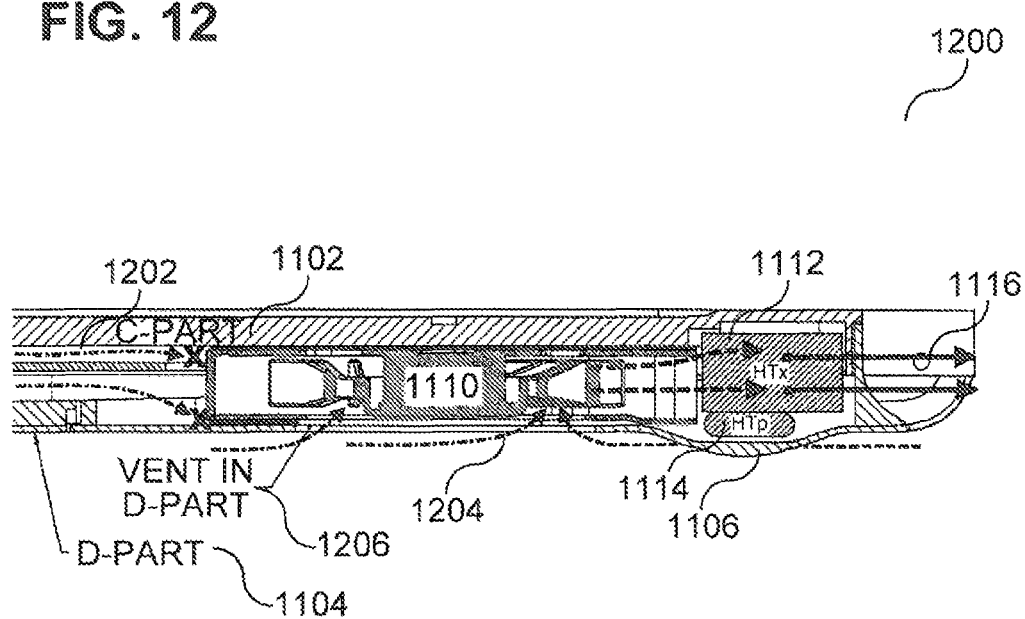
FIG. 12 shows a part of a housing for a notebook computer according to various embodiments with the thermal door closed.

FIG. 12 shows a part of a housing for a notebook computer 1200 according to various embodiments with the thermal door 1106 closed. Various parts shown in FIG. 12 are similar or identical to parts shown in FIG. 11, so that the same reference signs may be used and that repeated description may be omitted. The notebook computer 1200 with the thermal door 1106 closed may have the same overall Z-height as a minimal height system. Operation may be possible, but it may be desired to operate with reduced performance. Little air may be drawn (for example to the blower 1110) from the interior of the system. All inlet flow may be from outside the computer through vents 1206 in the D-housing, like indicated by dash-dotted arrows 1204. The "X's" a the end of arrows 1202 may indicate choked flow into the fans (for example the blower 1110) from inside the computer.

With the thermal door 1106 closed, there may be the potential to have a reduced performance "ultrabook mode" (which may be understood as that the computer has a very small overall Z-height in this operation mode). In this mode air may be drawn in from outside the computer through a vent (or more vents) in the thermal door. This air may flow directly into the blower and out through the heat exchanger, which may only cool the components that are directly attached to the heat pipe system. Since this design may not cool other components by drawing warm air from the interior of the housing, the performance of the system may have to be throttled to prevent overheating these components. In other words: a reduced performance operation may be achieved by providing an inlet vent in the skin of the (thermal) door, so that cooling may be provided (or limited) to the components tied to the heat pipe.

Figure 13:
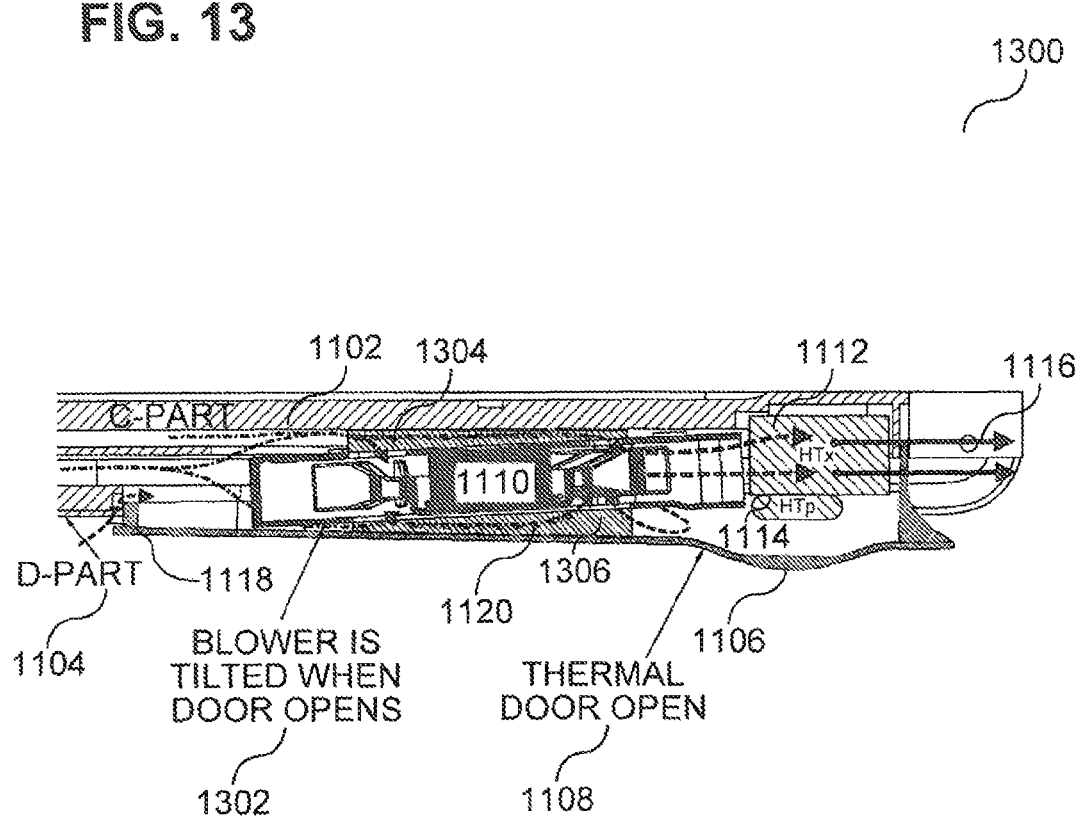
FIG. 13 shows a part of a housing for a notebook computer according to various embodiments with the thermal door open and a blower rotated.

FIG. 13 shows a part of a housing for a notebook computer 1300 according to various embodiments with the thermal door 1106 open and the blower 1110 rotated. Various parts shown in FIG. 12 are similar or identical to parts shown in FIG. 11, so that the same reference signs may be used and that repeated description may be omitted. Like will be described, an improved blower inlet flow may be provided by rotating the fan (in other words: the blower 1110) when the (thermal) door 1106 is opened. The notebook computer 1300 may have the same Z-height when the thermal door 1106 is closed as the computer 1200 shown in FIG. 12. The notebook computer 1300 may have the same Z-height when the thermal door 1106 is opened as the computer 1100 shown in FIG. 11. As indicated by 1302, the blower 1110 may tilt when the door 1106 opens. This may allow less restricted flow into the blower inlets from above and below the blower 1110. Like indicated by the hatched areas 1304 and 1306, an increased fan inlet (in other words: inlet to the blower 1110) may be provided.

As described above, the air flow into the blower inlets may be further improved by tilting the blower when the door is opened. For example, a flow area 1306 into a lower fan inlet may be provided, and a flow area 1304 into an upper fan inlet may be provided.

Figure 14:
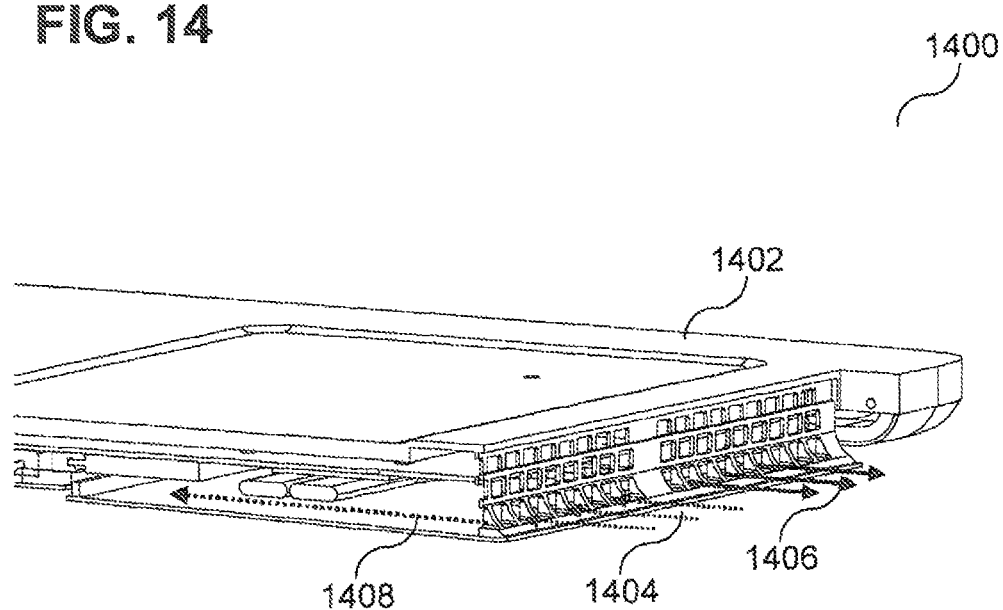
FIG. 14 shows a portion of a notebook computer with a thermal door open.

FIG. 14 shows a portion 1402 of a notebook computer 1400 with a thermal door open. Cool air may be input to the notebook computer 1400 through cool air inlets, like indicated by dotted arrows 1404. A cool air path through the system may be more open (for example compared to the case when the thermal door is closed), and airflow throughout the system may be increased, like indicated by arrow 1408. For example, with attention given to ducting, air may be directed to flow across critical components. The increased gap between hot components and the door panel (of the thermal door) may reduce skin temperature of the notebook computer 1400. Warm air may be exhausted from the notebook computer 1400, like indicated by solid arrows 1406.

With the thermal door open, overall air flow through (or throughout) the system (with an open thermal door) may be improved by creating room for air to flow away from the tightly packed components inside the housing. A free flow through the system may be provided.

A system with a thermal door may meet the desire for thin computers without compromising the high heat flows required for high performance gaming computers.

The devices and methods provided may ease the limitations of notebook computer design by allowing more heat to be removed from the system without increasing the apparent thickness of the computer.

The opening of the thermal door (in other words: the movement of the lower part away from the upper part) may be performed using a 4-bar mechanism. In other words, the door motion may be controlled by a 4-bar mechanism. In other words, the pressure drop reducing mechanism may include a 4-bar mechanism.

Figure 15A:
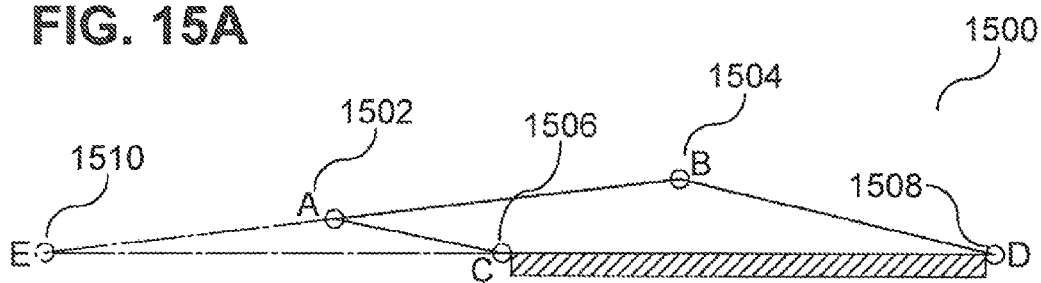
FIG. 15A to FIG. 15E show a 4-bar mechanism for a thermal door.

FIG. 15A shows a 4-bar mechanism 1500. A first joint A 1502, a second joint B 1504, a third joint C 1506, and a fourth joint D 1508 may be provided. Bars may be provided between the joints A and B (which may be referred to as bar AB), between B and D (which may be referred to as bar BD), between D and C (which may be referred to as bar or CD, and which may be a fixed bar, for example a ground link, like indicated in FIG. 15A by the hatched square), and between C and A (which may be referred to as bar AC). Thus, the four bars (or links) in the mechanism may be AB, AC, BD, and CD, Link AB may be the ground link and may not move. At the junction of each link a joint (for example pivot joint) may be provided (for example the above referenced joints A, B, C, and D). It will be understood that the letters A, B, C, and D as used in FIG. 15 may not correspond to the letters used for referring to an A part, B part, C part, or D part of a notebook computer housing, as used in FIG. 3B.

Figure 15B:
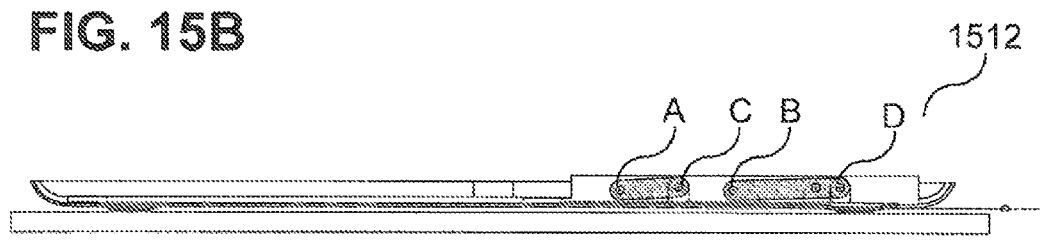
Figure 15C:
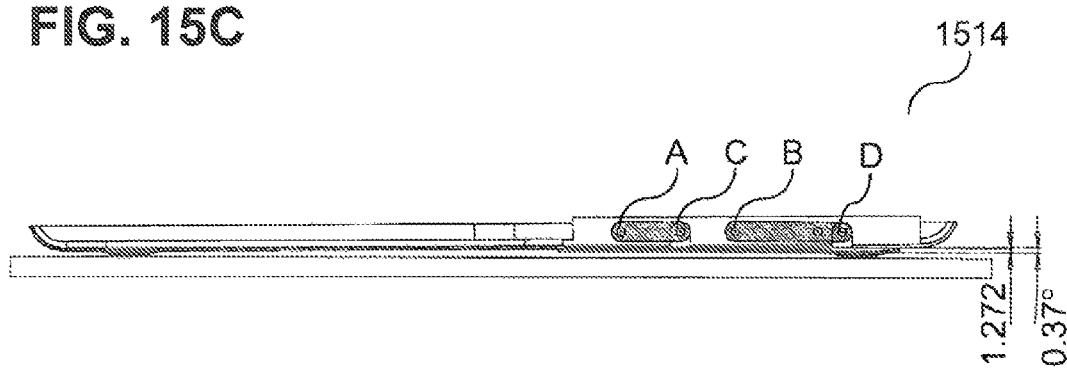
Figure 15D:
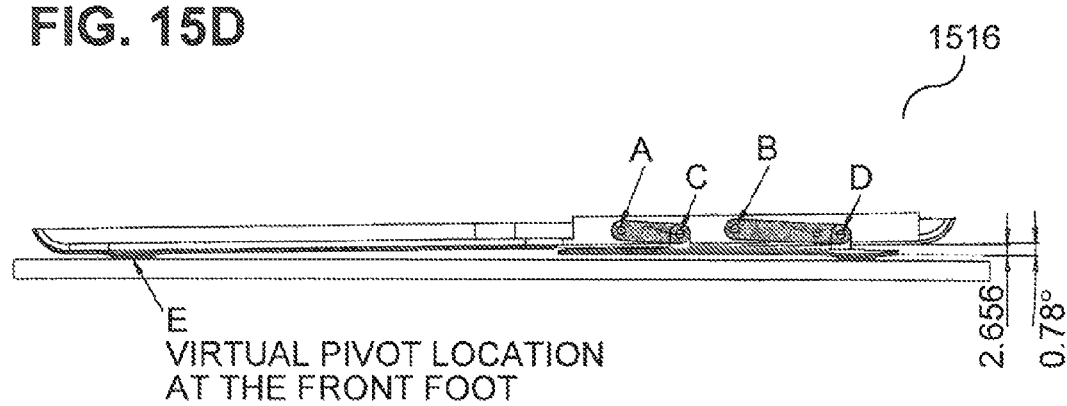

In the housing of a computer system according to various embodiments, the parts of the four links may correspond to the following parts as shown in an illustration 1512 in FIG. 15B, and illustration 1514 in FIG. 15C, and an illustration 1516 in FIG. 15D: AB may correspond to a D-part assembly; AC may correspond to a front link; BD may correspond to a rear link; and CD may correspond to the lower portion (for example the (thermal) door, which may be a separate portion of the D-part, like will be described with reference to FIG. 15E in more detail below.

By making the two links AC and BD of unequal length, the link CD may be made to move as if it has a virtual pivot at location E 1510 (technically, this may be only true at the start and end positions, but for a small range of motion, it may give the appearance of a virtual pivot at a single point). In the parts of the computer system, the virtual pivot may for example be located at a front foot of the housing of the computer system.

The point of having the virtual pivot at the front foot is to maintain (or at least give the appearance of maintaining) the relationship between the door and the table throughout the range of motion; in other words: the door may remain in the same location and orientation, parallel to the table.

Figure 15E:
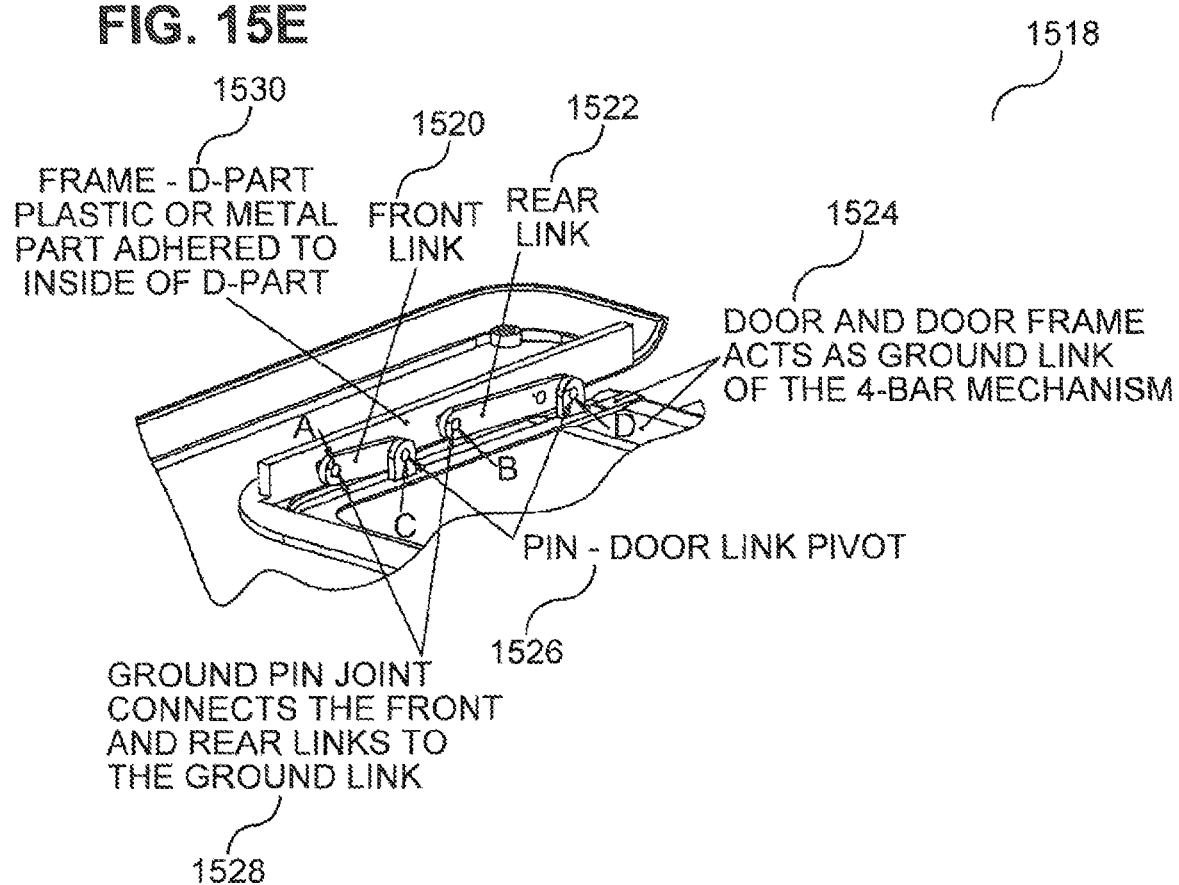

FIG. 15E shows a detailed view 1518 of the 4-bar mechanism. A front link 1520 may be provided as link AC. A rear link 1522 may be provided as link BD. The lower portion (for example a door and a door frame 1524) may act as the ground link CD of the 4-bar mechanism. A frame D-part 1530, which, may include a part, for example a plastic part or a metal part, adhered to the inside of the D-part, may provide the link AB. Pins 1526 for a door link pivot may be provided at joints C and D. Ground pin joints 1528 at A and B may connect the front link and rear link to the ground link.

Figure 16A:
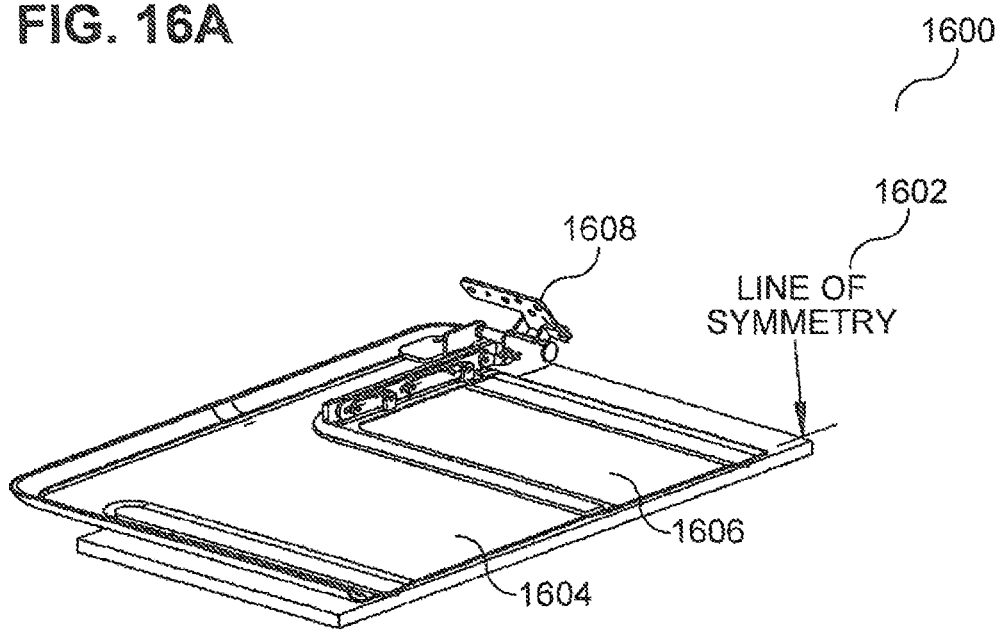
FIG. 16A to FIG. 16I show a slider mechanism for a thermal door.

FIG. 16A shows an illustration 1600 of a line of symmetry 1602 for the following views, A portion 1608 for attaching a display (not shown), a D part 1604 and a thermal door 1606 may be provided.

Figure 16B:
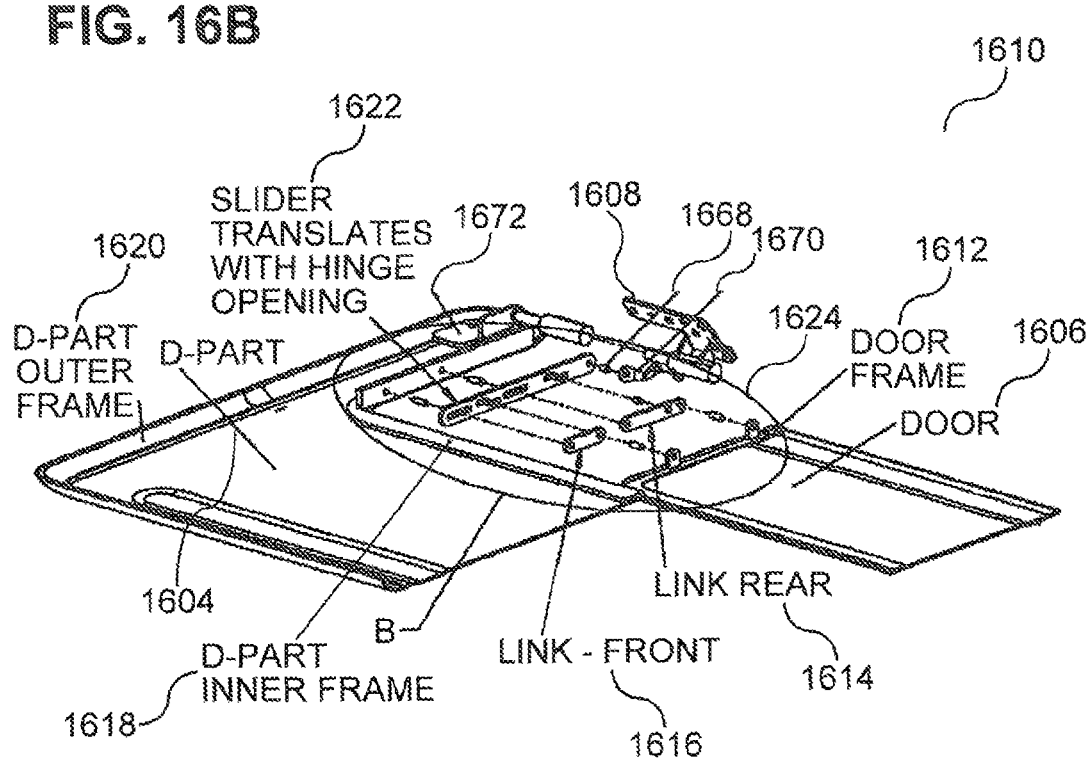

The views of FIG. 16A and FIG. 16B show only half of the assembly. The door assembly and the D-parts assembly are cut in half at the line of symmetry 1602 for visualization purposes. All other parts are mirrored across the line of symmetry in the housing for the computer system.

The pressure drop reducing mechanism may include a slider mechanism, like will be described in more detail below.

Figure 16C:
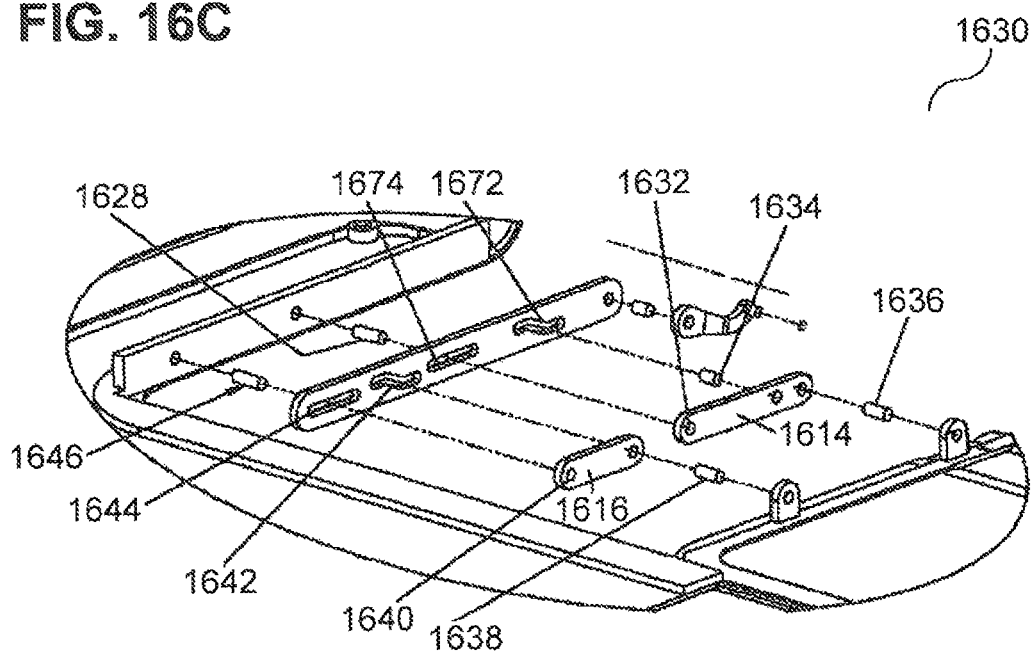

FIG. 16B shows an exploded view 1610 of a slider mechanism for moving a lower portion of the housing (for example the (thermal) door 1606) away from an upper portion (for example a C part (not shown in FIG. 16B)). A door frame 1612 may be provided as a frame for the door 1612. The D-part 1604 may include a D-part outer frame 1620 and a D-part inner frame 1618. The portion 1608 for attaching a display may be a bar (for example corresponding to bar AB like shown in its abstract form in FIG. 15A), and may be attached to a display assembly (not shown). A bar 1672 (for example corresponding to bar CD like shown in its abstract form in FIG. 15A) may be attached to the D-part 1604. A slider 1622 may translate with hinge openings. A connecting rod 1670 may connect the AB hinge 1608 to the slider 1622 and may transmit hinge rotation to slider translation. A pin 1668 may provide pivoting connection between connecting the rod 1670 and the slider 1622. Furthermore, a front link 1616 and a rear link 1614 may be provided. A portion of the view 1610 indicated by ellipse B 1624 is shown in an enlarged view 1630 in FIG. 16C.

A first further pin 1646 may be rigidly attached to the D-part inner frame.

A second further pin may be rigidly attached to the D-part inner frame. A third further pin 1638 may provide a pivot connection to the door frame and the front link 1616 and may also ride in a front drive 1642 and may drive the motion of the front link 1616, and may be rigidly attached to the door or the link and may provide pivot to the other part. A fourth further pin 1636 may provide pivot attachment from the rear link 1614 to the door.

The front link 1616 may pivot on the first further pin 1646, like indicated by reference number 1640. The rear link 1614 may pivot on the second further pin 1628, like indicated by reference number 1632.

The third further pin 1638 may ride on the front drive slot 1640. As the slider translates the slot 1640 drives the pin 1638, thus opening and closing the door.

A slider slot 1644 may ride on the first further pin 1646 and may limit the motion of the slider to translation.

The second further pin 1628 may ride in a rear slider slot 1674. This may limit the slider motion to translation.

A rear drive pin (which may also be referred to as a rear link drive pin) 1634 may ride in a rear driver slot 1672, and may be rigidly attached to a location on the rear link 1614. The location of this rear link drive pin 1634 may be at a distance equal to the length of the front link 1614. This may allow the two drive slots on the slider to have the same profile, while driving the rear link through a larger angular motion than the front link 1616.

The rear drive pin 1634 may ride in the rear drive slot 1672, controlling the motion of the rear link 1614.

Figure 16D:
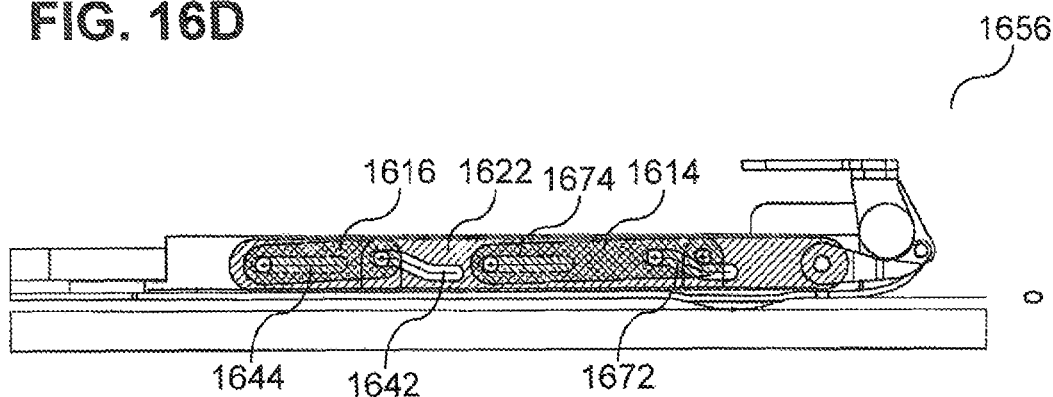
Figure 16E:
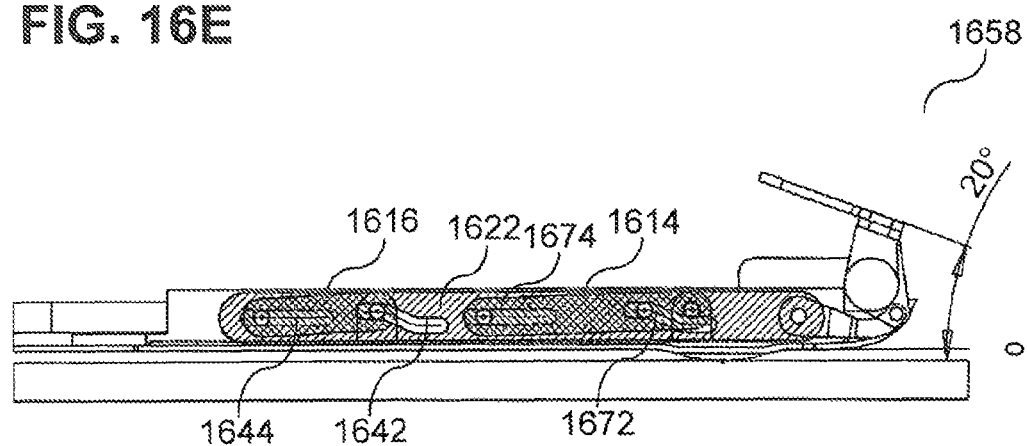
Figure 16F:
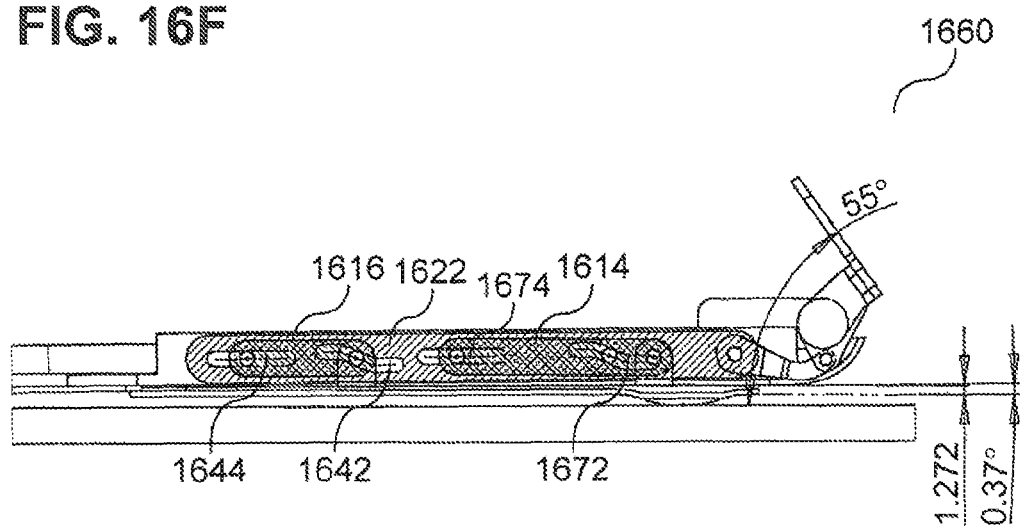
Figure 16G:
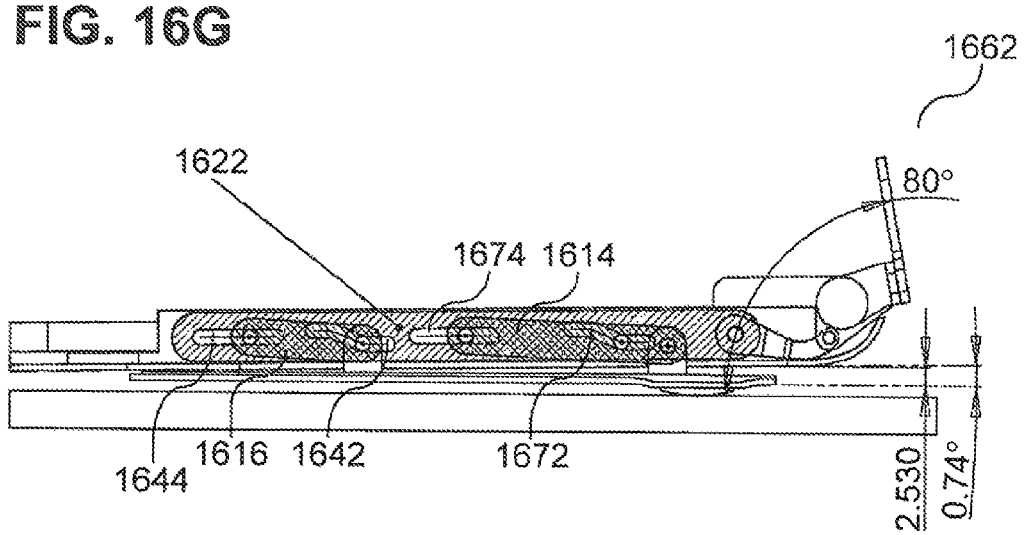
Figure 16H:
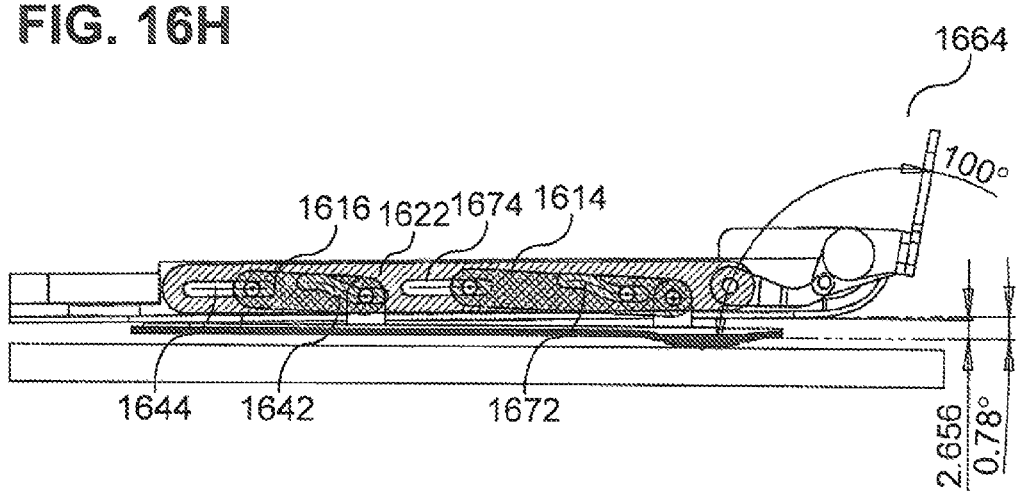
Figure 16I:
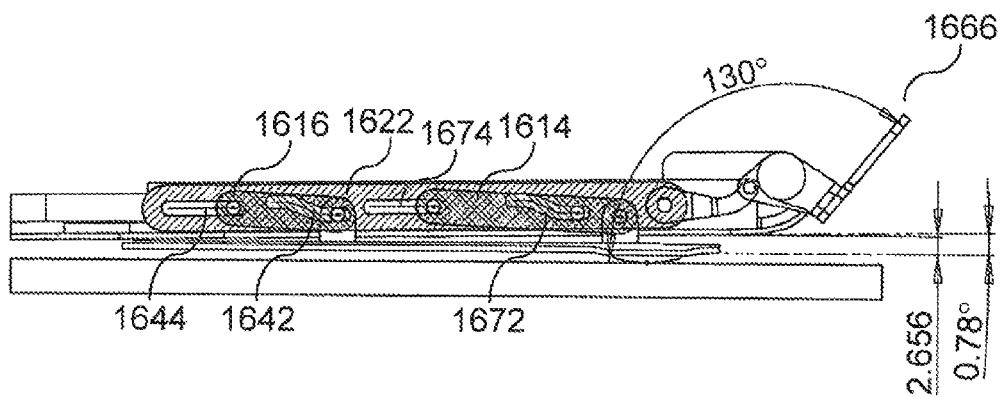

An illustration 1656 in FIG. 16D, an illustration 1658 in FIG. 16E, an illustration 1660 in FIG. 16F, an illustration 1662 in FIG. 16G, an illustration 1664 in FIG. 16H, and an illustration 1666 in FIG. 16I illustrate how the slider works, and show the slider mechanism for various angles at which the display is opened.

Figure 17A:
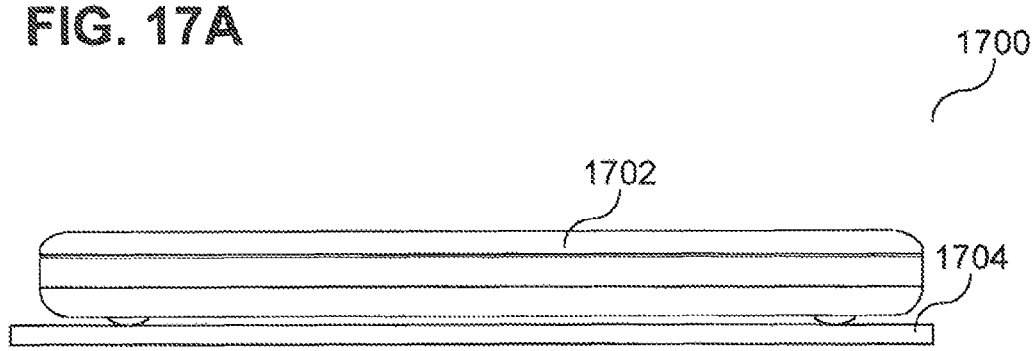

FIG. 17A shows a case 1700 in which a display of a notebook computer 1702 placed on a table 1704 is closed.

Figure 17B:
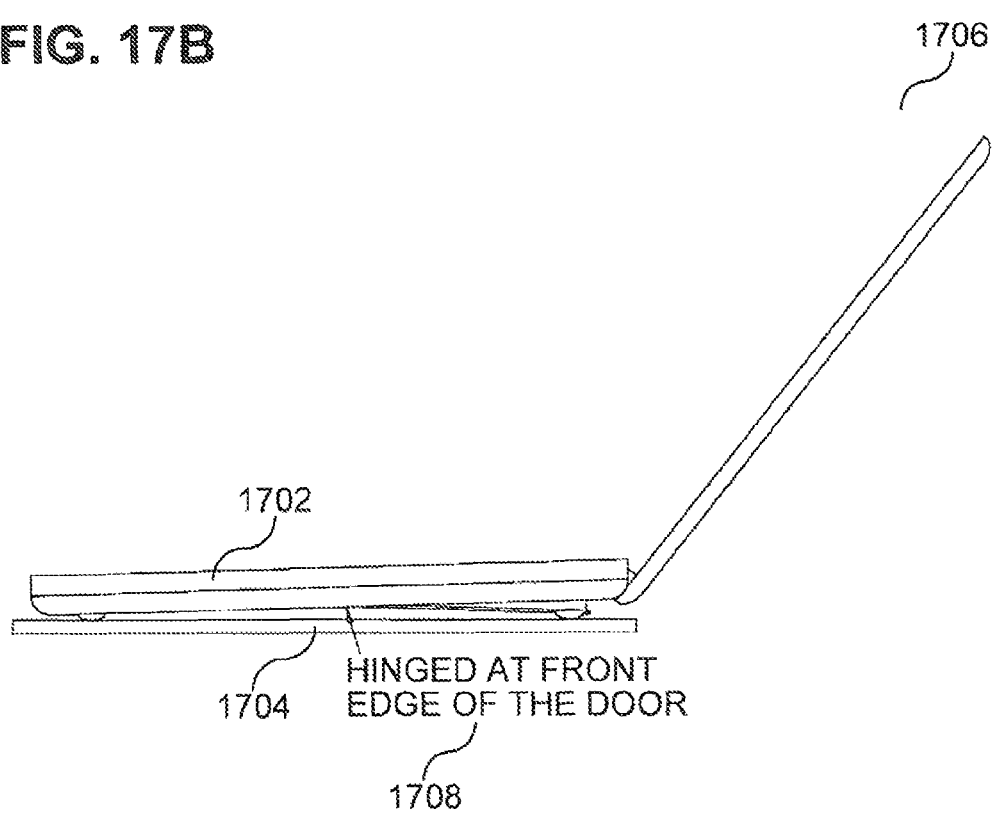

FIG. 17B shows a case 1706, where the door is hinged at a front end of the door, like indicated by 1708.

FIG. 17C shows a case 1710, where the door stays parallel to a D-case (or D-part of the housing), so that the outside face of the door stays parallel to the outside face of the case (or housing), like indicated by 1712

FIG. 17D shows a case 1714, where the door stays parallel to the table 1704. A virtual binge axis 1716 may be provided at a front foot of the housing of the notebook computer, so that the door may have a virtual hinge located at the point of contact of the front foot to the table. Thus, the outside face of door may stay parallel to the table 1704, like indicated by 1718.

The following examples pertain to further embodiments.

Example 1 is a housing for a computer system, the housing comprising: an upper portion configured to hold an input device of the computer system; and a lower portion comprising a foot of the housing for the computer system; a pressure drop reducing mechanism configured to increase an airflow between the upper portion and the to upper portion by moving the lower portion away from the upper portion.

In example 2, the subject-matter of example 1 can optionally include that the upper portion comprises a C part.

In example 3, the subject-matter of any one of examples 1 to 2 can optionally include that the lower portion comprises at least a portion of a D part.

In example 4, the subject-matter of any one of examples 1 to 3 can optionally include that the pressure drop reducing mechanism is configured to linearly move the lower portion away from the upper portion.

In example 5, the subject-matter of any one of examples 1 to 4 can optionally include that the pressure drop reducing mechanism is configured to rotate the lower portion away from the upper portion.

In example 6, the subject-matter of any one of examples 1 to 5 can optionally include that the pressure drop reducing mechanism comprises a hinge.

In example 7, the subject-matter of any one of examples 1 to 6 can optionally include that the pressure drop reducing mechanism comprises a four bar mechanism.

In example 8, the subject-matter of any one of examples 1 to 7 can optionally include that the pressure drop reducing mechanism is coupled to a display housing for the computer system.

In example 9, the subject-matter of example 8 can optionally include that the pressure drop reducing mechanism is configured to increase the airflow when the display housing is folded away from the upper portion of the housing.

In example 10, the subject-matter of any one of examples 1 to 9 can optionally include a blower, wherein the pressure drop reducing mechanism is further configured to tilt the blower when moving the lower portion away from the upper portion Example 11 is a part of a housing for a computer system, the part comprising: a pressure drop reducing mechanism configured to increase an airflow between an upper portion of the housing and a lower portion of the housing by moving the lower portion away from the upper portion, wherein the upper portion is configured to hold an input device of the computer system and the lower portion comprises a foot of the housing for the computer system.

In example 12, the subject-matter of example 11 can optionally include that the part comprises the upper portion.

In example 13, the subject-matter of any one of examples 11 to 12 can optionally include that the part comprises a C part.

In example 14, the subject-matter of any one of examples 11 to 13 can optionally include that the part comprises the lower portion.

In example 15, the subject-matter of any one of examples 11 to 14 can optionally include that the part comprises at least a portion of a D part.

In example 16, the subject-matter of any one of examples 11 to 15 can optionally include that the pressure drop reducing mechanism is configured to linearly move the lower portion away from the upper portion.

In example 17, the subject-matter of any one of examples 11 to 16 can optionally include that the pressure drop reducing mechanism is configured to rotate the lower portion away from the upper portion.

In example 18, the subject-matter of any one of examples 11 to 17 can optionally include that the pressure drop reducing mechanism comprises a hinge.

In example 19, the subject-matter of any one of examples 11 to 18 can optionally include that the pressure drop reducing mechanism comprises a four bar mechanism.

In example 20, the subject-matter of any one of examples 11 to 19 can optionally include that the pressure drop reducing mechanism is coupled to a display housing for the computer system.

In example 21, the subject-matter of example 20 can optionally include that the pressure drop reducing mechanism is configured to increase the airflow when the display housing is folded away from the upper portion of the housing.

Example 22 is a method for increasing an airflow in a housing of a computer system, the method comprising: moving a lower portion of the housing away from an upper portion of the housing, wherein the upper portion is configured to hold an input device, of the computer system and the lower portion comprises a foot of the housing for the computer system.

In example 23, the subject-matter of example 22 can optionally include that the upper portion comprises a C part.

In example 24, the subject-matter of any one of examples 22 to 23 can optionally include that the lower portion comprises at least a portion of a D part.

In example 25, the subject-matter of any one of examples 22 to 24 can optionally include that moving a lower portion of the housing away from an upper portion of the housing comprises linearly moving the lower portion away from the upper portion.

In example 26, the subject-matter of any one of examples 22 to 25 can optionally include that moving a lower portion of the housing away from an upper portion of the housing comprises rotating the lower portion away from the upper portion.

In example 27, the subject-matter of any one of examples 22 to 26 can optionally include that the lower portion of the housing is moved away from an upper portion of the housing using a hinge.

In example 28, the subject-matter of any one of examples 22 to 27 can optionally include that the lower portion of the housing is moved away from an upper portion of the housing using a four bar mechanism.

In example 29, the subject-matter of any one of examples 22 to 28 can optionally include that moving a lower portion of the housing away from an upper portion of the housing is performed using a pressure drop reducing mechanism which is coupled to a display housing for the computer system.

In example 30, the subject-matter of example 29 can optionally include that the lower portion of the housing is moved away from the upper portion of the housing when the display housing is folded away from the upper portion of the housing.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A housing for a computer system, the housing comprising:
   an upper portion configured to hold an input device of the computer system;
   a lower portion comprising a foot of the housing for the computer system, wherein the lower portion comprises a lower housing of the computer system and a thermal door that fits in an opening in the lower housing;
   a blower arranged between the upper portion and the thermal door;
   a pressure drop reducing mechanism configured to increase an airflow to the blower by moving the thermal door from a closed position to an open position;
   wherein in the closed position, the thermal door is level with the lower housing;
   wherein in the open position, the thermal door is vertically displaced from the lower housing such that a distance between the blower and the thermal door increases; and
   wherein the pressure drop reducing mechanism comprises a four bar mechanism, the four bar mechanism comprising:
      a first fixed bar connecting a first joint and a second joint, the first fixed bar affixed to the lower housing;
      a second fixed bar connecting a third joint and a fourth joint, the second fixed bar affixed to the thermal door;
      a front bar pivotably coupled to each of the first joint and the third joint; and
      a rear bar pivotably coupled to each of the second joint and the fourth joint;
      wherein the front bar is shorter than the rear bar.

2. The housing of claim 1,
   wherein the upper portion comprises an upper housing of a main unit comprising a keyboard and a track pad.

3. The housing of claim 1,
   wherein the pressure drop reducing mechanism is configured to linearly move the thermal door away from the lower housing.

4. The housing of claim 1,
   wherein the pressure drop reducing mechanism is configured to rotate the thermal door away from the lower housing.

5. The housing of claim 1,
   wherein the pressure drop reducing mechanism comprises a hinge.

6. The housing of claim 1,
   wherein the pressure drop reducing mechanism is coupled to a display housing for the computer system.

7. The housing of claim 6,
   wherein the pressure drop reducing mechanism is configured to increase the airflow when the display housing is folded away from the upper portion of the housing.

8. The housing of claim 1, wherein in the open position, the thermal door is at least substantially parallel to the lower housing.

9. The housing of claim 1, wherein in the open position, the thermal door is directly under the blower.

10. The housing of claim 1, wherein an inlet of the blower faces the thermal door.

11. A part of a housing for a computer system, the part comprising:
    a pressure drop reducing mechanism configured to increase an airflow to a blower arranged between an upper portion of the housing and a thermal door of a lower portion of the housing,
    wherein the lower portion of the housing comprises a lower housing of the computer system and the thermal door, wherein the thermal door fits in an opening in the lower housing;
    wherein the upper portion is configured to hold an input device of the computer system and the lower portion comprises a foot of the housing for the computer system;
    wherein the pressure drop reducing mechanism is configured to increase the airflow to the blower by moving the thermal door from a closed position to an open position;
    wherein in the closed position, the thermal door is level with the lower housing;
    wherein in the open position, the thermal door is vertically displaced from the lower housing such that a distance between the blower and the thermal door increases;
    wherein the pressure drop reducing mechanism comprises a four bar mechanism, the four bar mechanism comprising:
       a first fixed bar connecting a first joint and a second joint, the first fixed bar affixed to the lower housing;

a second fixed bar connecting a third joint and a fourth joint, the second fixed bar affixed to the thermal door;

a front bar pivotably coupled to each of the first joint and the third joint; and a rear bar pivotably coupled to each of the second joint and the fourth joint;

wherein the front bar is shorter than the rear bar.

12. The part of the housing of claim 11, wherein the part of the housing comprises the upper portion.

13. The part of the housing of claim 11, wherein the part of the housing comprises the lower portion.

14. A method for increasing an airflow in a housing of a computer system, the method comprising:

moving a thermal door of a lower portion of the housing from a closed position to an open position to increase an airflow to a blower arranged between an upper portion of the housing and the thermal door, using a pressure drop reducing mechanism, wherein the upper portion is configured to hold an input device of the computer system and the lower portion comprises a foot of the housing for the computer system;

wherein the lower portion of the housing comprises a lower housing of the computer system and the thermal door, wherein the thermal door fits in an opening in the lower housing; and wherein the pressure drop reducing mechanism is configured to increase the airflow to the blower by moving the thermal door from a closed position to an open position;

wherein in the closed position, the thermal door is level with the lower housing;

wherein in the open position, the thermal door is vertically displaced from the lower housing such that a distance between the blower and the thermal door increases;

wherein the pressure drop reducing mechanism comprises a four bar mechanism, the four bar mechanism comprising:

a first fixed bar connecting a first joint and a second joint, the first fixed bar affixed to the lower housing;

a second fixed bar connecting a third joint and a fourth joint, the second fixed bar affixed to the thermal door;

a front bar pivotably coupled to each of the first joint and the third joint; and a rear bar pivotably coupled to each of the second joint and the fourth joint;

wherein the front bar is shorter than the rear bar.

15. The method of claim 14, wherein moving the thermal door of the housing away from the lower housing comprises linearly moving the thermal door away from the lower housing.

16. The method of claim 14, wherein moving the thermal door away from the lower housing comprises rotating the thermal door away from the lower housing.

17. The method of claim 14, wherein the thermal door is moved away from the lower housing using a hinge.

18. The method of claim 14, wherein the thermal door is moved away from the lower housing using the four bar mechanism.

19. The method of claim 14, wherein the pressure drop reducing mechanism is coupled to a display housing for the computer system.

20. The method of claim 19, wherein the thermal door is moved away from the lower housing when the display housing is folded away from the upper portion of the housing.

* * * * *